Figure 1:
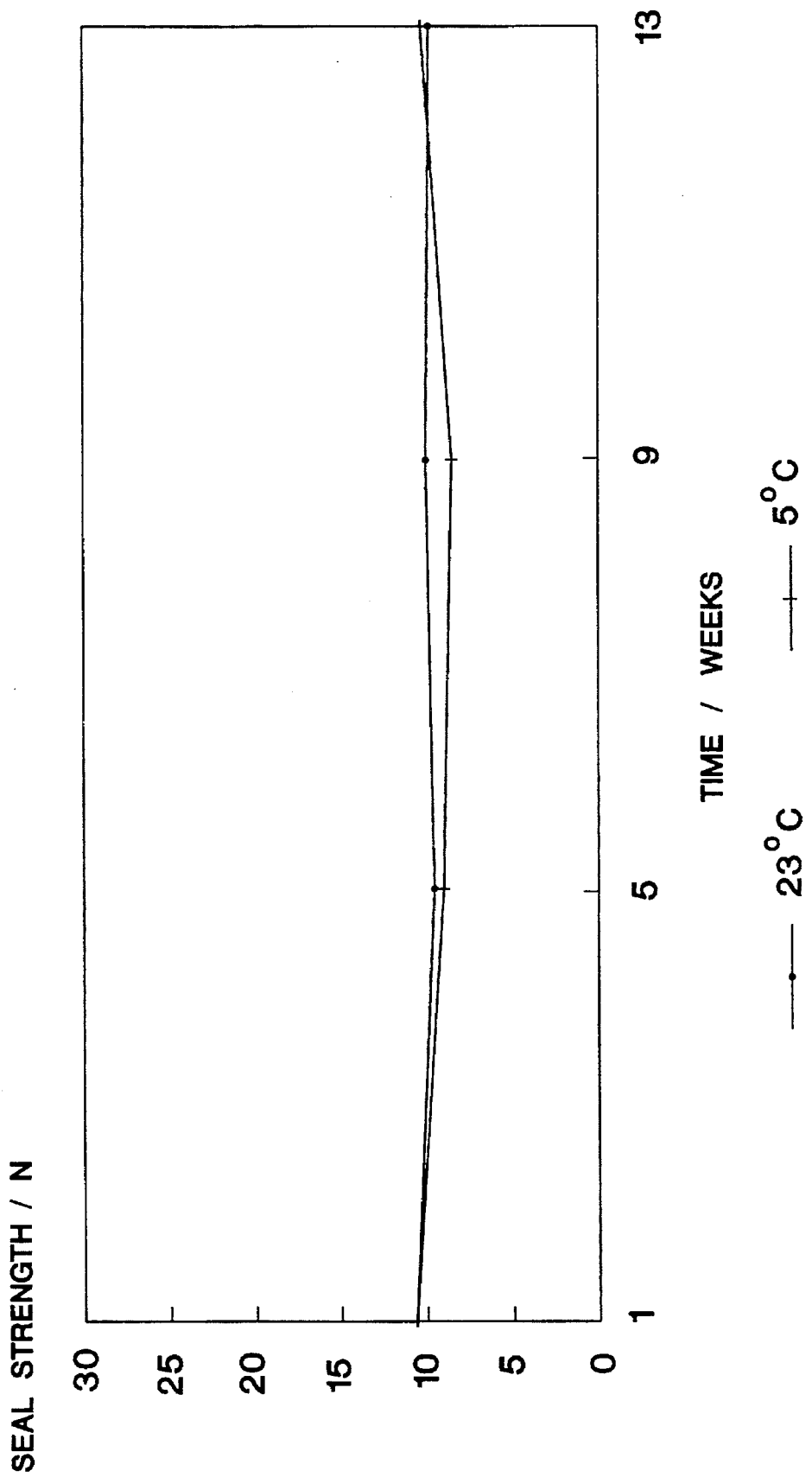
Figure 2:
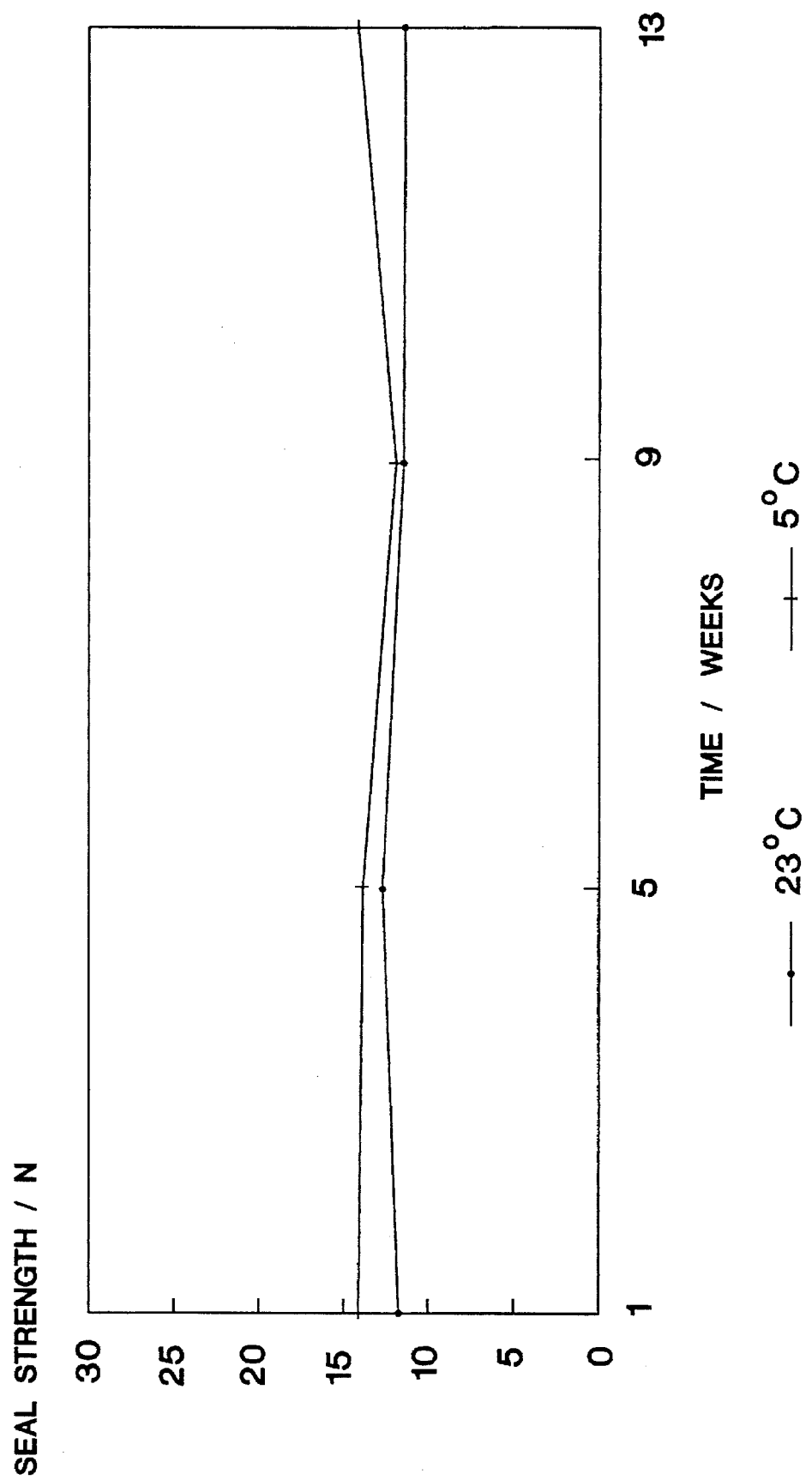
Figure 3:
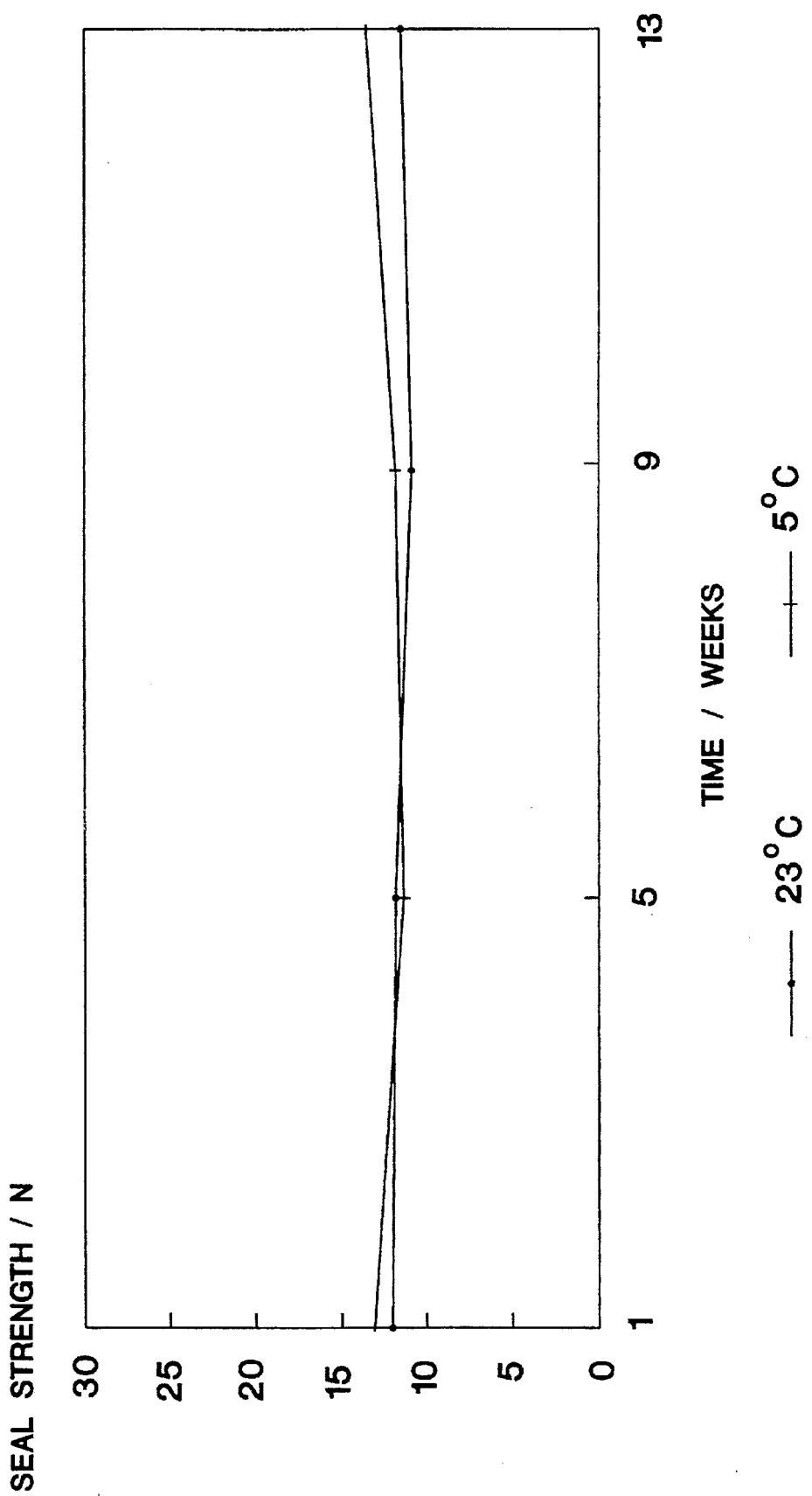
Figure 4:
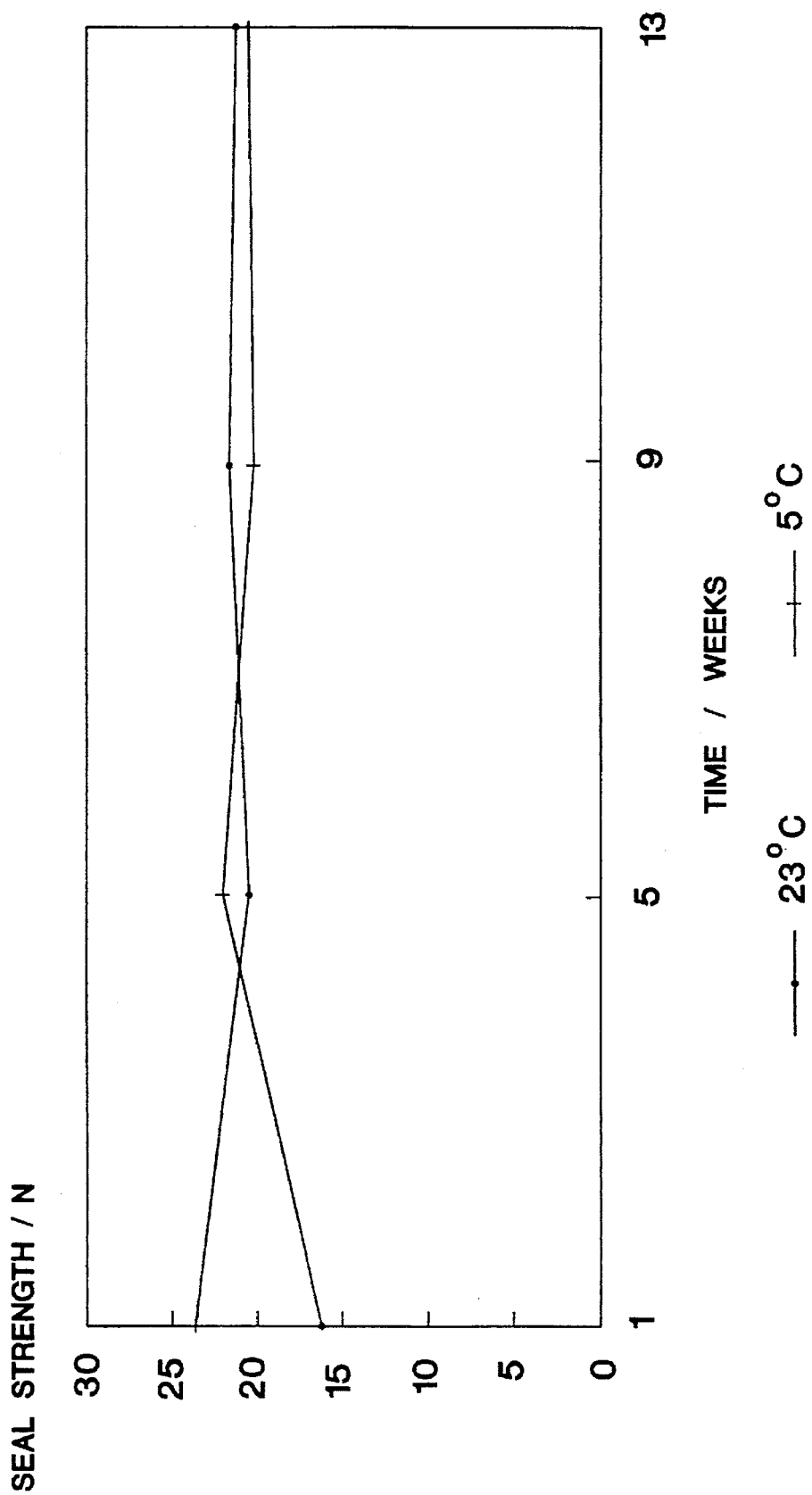
Figure 5:
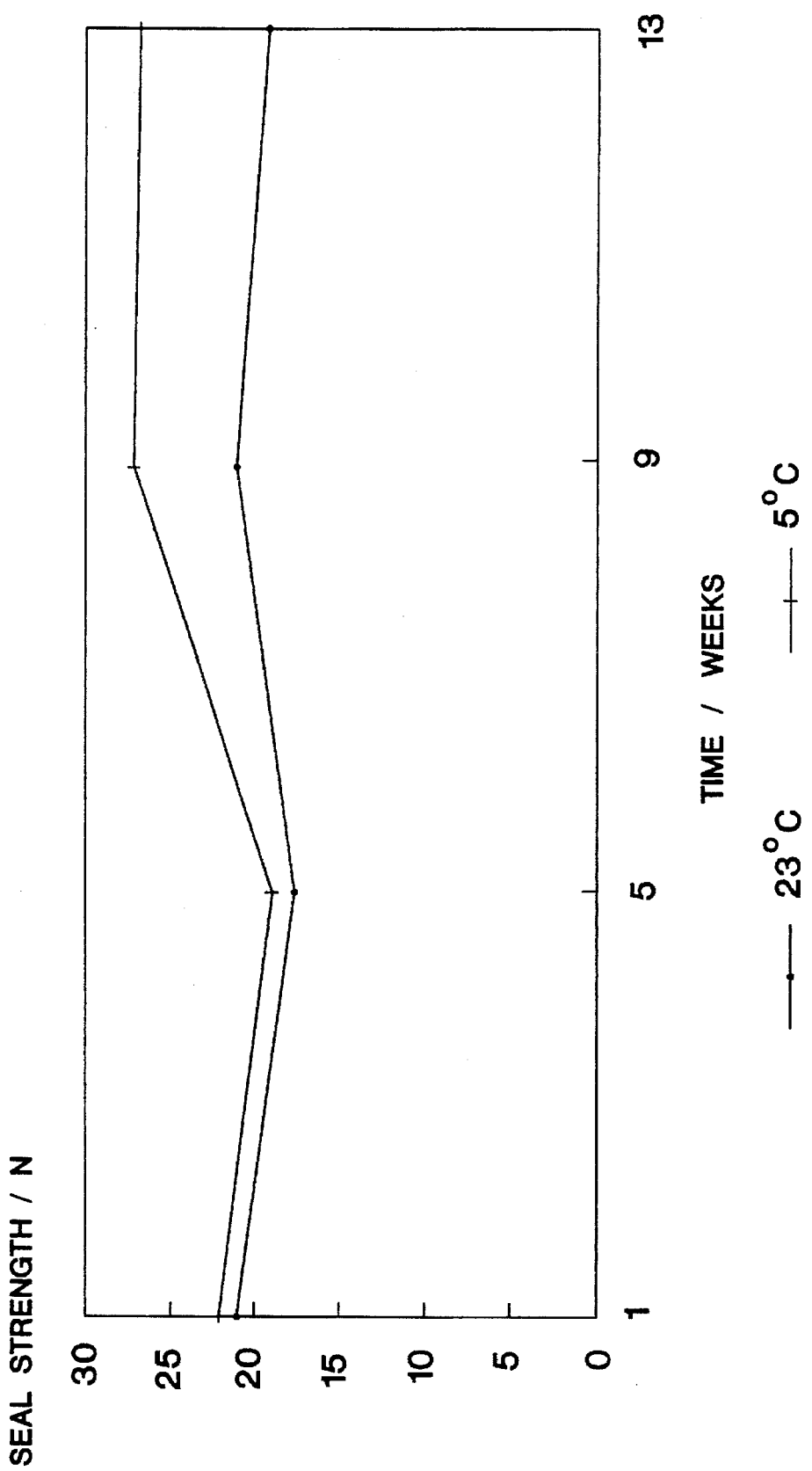

United States Patent [19]

Seppänen et al.

[11] Patent Number: 5,663,232
[45] Date of Patent: Sep. 2, 1997

[54] PLASTIC MATERIAL FOR PACKAGING

[75] Inventors: Hanneli Seppänen, Helsinki; Marja Ora, Vantaa; Lars-Åke Mattsson, Porvoo; Markku Sainio, Porvoo; Torvald Vestberg, Porvoo, all of Finland

[73] Assignee: Borealis Holding A/S, Provoo, Finland

[21] Appl. No.: 318,765

[22] PCT Filed: Apr. 14, 1993

[86] PCT No.: PCT/FI93/00159

§ 371 Date: Oct. 14, 1994

§ 102(e) Date: Oct. 14, 1994

[87] PCT Pub. No.: WO93/21268

PCT Pub. Date: Oct. 28, 1993

[30] Foreign Application Priority Data

Apr. 16, 1992 [FI] Finland ................................. 921714

[51] Int. Cl.$^6$ ....................................................... C08L 33/00
[52] U.S. Cl. ........................................ 524/523; 525/223
[58] Field of Search ............................. 524/523; 525/223

[56] References Cited

U.S. PATENT DOCUMENTS

| 4,318,742 | 3/1982 | Lokken | 106/35 |
| 4,376,845 | 3/1983 | Metzger | 525/196 |
| 4,460,728 | 7/1984 | Schmidt, Jr. et al. | 524/271 |
| 4,752,634 | 6/1988 | Goss | 524/271 |
| 4,759,984 | 7/1988 | Hwo | 428/349 |
| 5,321,080 | 6/1994 | Kumano et al. | 525/79 |
| 5,342,887 | 8/1994 | Bergstrom et al. | 525/108 |

FOREIGN PATENT DOCUMENTS

| 0178061 | 4/1986 | European Pat. Off. . |
| 0213698 | 3/1987 | European Pat. Off. . |
| 0293074 | 11/1988 | European Pat. Off. . |
| 0300104 | 1/1989 | European Pat. Off. . |
| 0339990 | 11/1989 | European Pat. Off. . |
| 0474376 | 2/1991 | European Pat. Off. . |

*Primary Examiner*—Edward J. Cain
*Attorney, Agent, or Firm*—Birch, Stewart, Kolasch & Birch, LLP

[57] ABSTRACT

The invention relates to sealable and pealable polymer compositions which contain 20–80 weight % polyolefin and 80–20 weight % ethylene-hyaroxyacrylate co- or terpolymer in which as one comonomer is 5–30 weight % hydroxyacrylate and as another comonomer 0–40 weight % vinyl compound. The composition is pealable also after heat processing.

14 Claims, 5 Drawing Sheets

PLASTIC MATERIAL FOR PACKAGING

The present invention relates to a peelable polymer blend or compound, a method for making the blend or compound and films, sheets and lamination products made from the blend or compound.

In the packaging industry it is conventional that a product is packaged in a plastic film or a rigid plastic package and the package is heat sealed. The seal must possess a mechanical resistance sufficient to maintain the tight-seal properties during storage and transport. It is required that the package can be opened without destroying the product inside but to a growing extent must also be possible to open the package without destroying the integrity of the film itself. The seal must be easily openable with pulling by hands without scissors or other instruments, the seal must be peelable. The package can also be used after opening for instance as a serving or heating disk (yoghurt, micro-oven food) or when whole product is not taken away instantly but is kept in the open package (candies, cereals).

The peelable seal can be defined to be the seal or joint between two films or sheets produced by heat sealing or impulse sealing, the joint thus formed having the property of being openable by pulling with hands. The seal can be between two films or two sheets or between a film or sheet and some substrate. Depending on the substrate an adhesion layer may sometimes be needed between the substrate and the sheet or film.

The use of peelable seals in different packages has become more common with the development of packaging techniques. There is a special need in the food processing industry, where there are applications in all sections, e.g. dairy products (cheeses, yoghurt), frozen food products, ready-processed foods, canned foods, meat and meat products, different snack and sweet packages. A very fast growing group is ready processed foods and canned foods which are heated mainly in a microwave oven. A great part of packed foods are heat-processed after packaging when the materials and seals must resist the processing conditions. On the other hand sterilisable packages are needed also elsewhere as in packaging medical instruments.

Aluminium films and metallised plastic films are now commonly used in closing the heat-processable packages, e.g. containers.

In peelable compositions, one of the most commonly used components has been polybutylene and another is ethylene polymer, most often ethylene-vinyl acetate copolymer (EVA) or low density polyethylene (LDPE). Also polypropylene can be included in the compositions. For instance in U.S. Pat. No. 4,759,984 describes a polymer composition, where the main component is EVA (75–92 w-%) and minor mounts of polybutylene (6–25 w-%) and polypropylene (2–15 w-%) have been blended to it. Polyamide or polycarbonate are the most suitable substrates.

Published patent application EP 213,698 describes a composition, which consists of more than 50 w-% of polybutylene and the rest is polypropylene and an ethylene polymer (EVA, HDPE, LDPE, LLDPE). European patent 178,061 describes a polymer blend containing 65–85 w-% homo- or copolymer of ethylene (preferably LDPE or EVA), 5–30 w-% polybutylene and 3–15 w-% propylene polymer.

Peelable polymer compositions based on polybutylene can also be sterilizable. Patent publication EP 339,990 describes a composition of 8–49 w-% polybutylene and 92–51 w-% polyethylene, which may also be functinalised with e.g. maleic anhydride.

The purpose of this invention is to achieve a novel polymer composition, which is sealable, peelable and also heat-processable. The polymer composition according to the invention is characterized in that it is a blend of polyolefin and ethylene-hydroxy(meth)acrylate consisting of 20–80 w-% polyolefin and 80–20 w-% ethylene-hydroxy(meth) acrylate co- or terpolymer, having as one comonomer 5–30 w-% hydroxyacrylate and as the comonomer 0–40 w-% vinyl compound.

The use of ethylene-hydroxyacrylate copolymer in sealable and peelable polymer compositions is especially advantageous, because the adhesion and cohesion properties resulting from hydrogen bonds can be utilised there. The polymer blend has good sealing properties like low sealing temperature and good adhesiveness to other polyolefins. The blends of ethylene-hydroxyacrylate copolymer and polyolefins are especially suitable to be used in such applications, when packages are heat-processed after sealing. When using a polymer blend according to this invention the seal strengths remain stable after the heat-processing and the seals are totally peelable.

In the ethylene-hydroxy(meth)acrylate copolymer in the composition according to the invention hydroxyacrylate can be any ester of glycol or polyglycol and acrylic or methacrylic acid, but in most cases hydroxyethylacrylate, hydroxyethylmethacrylate, hydroxypropylacrylate or hydroxypropylmethacrylate are used. The content of hydroxyacrylate in copolymer can be 30 w-% highest. Besides hydroxyacrylate the polymer may contain other comonomers like vinyl acetate, acrylic acid, methacrylic acid or their esters.

The polyolefin in the composition can be propylene polymer such as propylene homopolymer or random copolymer containing 1–10 w-% of α-olefin such as ethylene, 1-butene, 3-methylbutylene or 4-methyl-1-pentene. Propylene polymer can also contain 5–70 w-% of filler such as talc. Polyolefin can also be ethylene polymer such as low or high density polyethylene (LDPE, HDPE) or linear ethylene copolymer (LLDPE) containing 1–10 w-% α-olefin, e.g. 1-butene, 1-hexene or 4-methyl 1-pentene.

The polymer blend or compound is made by conventional blending methods like melt blending in a one- or twin-screw extruder or in a Banbury mixer. Also dry blending can be used.

The polymer blend can also contain small amounts of conventional polymer additives such as antioxidants, antiblocking agents, antistatic agents etc.

The composition according to the invention can be used in manufacturing conventional packages containing peelable seals. From the polymer composition can be produced oriented or non-oriented blow- or cast films or sheets which are peelable. Also multilayer structures where one layer is made of film or sheet of the composition can be produced. It is typical for the products according to the invention that seal strength and peel strength are even in the whole sealing temperature area.

Peelable material described here can be sealed to itself or onto conventional materials used in packages, like polypropylene, polyethylene, polystyrene and polyvinylchloride. Also paperboard coated with plastic, e.g. polyethylene, can be used.

FIGS. 1–5 report the results of tests of seal strength.

The invention is described more in detail in the following examples.

The peeling temperature and seal strengths of the polymer compositions according to the invention were investigated in Examples 1–10. The following plastic materials were used in experiments:

HD-polyethylene=NCPE 7007

LD-polyethylene=NCPE 1804 random copolymer of propylene=XB18 50B (3% ethylene)

talc filled polypropylene=ET 6000 (60% talc)

EHEMA=NCPE 0465 (ethylene-hydroxyethylmethacrylate-copolymer, 9% hydroxyethylmethacrylate)

EVAHEMA=NCPE 0469 (ethylene-vinyl acetate-hydroxyethylmethacrylate-terpolymer, 9% hydroxyethylmethacrylate, 9% vinyl acetate)

All of the above mentioned materials are produced by Neste Chemicals. The most important properties are given in table 1.

TABLE 1

Properties of materials

| polymer | melt flow index, g/10 min (190° C.) | melting point °C. |
|---|---|---|
| NCPE 7007 | 7.0 | 130 |
| NCPE 1804 | 1.8 | 120 |
| XB 1850 B | 2.4 | 142–144 |
| ET 6000 | 6.5 (230° C.) | 150–160 |
| NCPE 0465 | 1.5 | 102 |
| NCPE 0469 | 8.0 | 91 |

EXAMPLE 1

50% ethylene-hydroxyethylmethacrylate-copolymer (EHEMA) and 50% HD-polyethylene were blended in a twin-screw extruder (screw diameter 80 mm, length/diameter-ratio 45). The temperature profile in blending was 160°–165°–165°–170°–170°–175°–175°–180° C., power 325 kWh and production capacity 1200 kg/h.

The blend was blown to films in Reifenhäuser 3-layer blown film equipment so that the material for the structural layer was in two extruders (polypropylene or HD-polyethylene) and the blend described above was in one extruder. So a 2-layer film was achieved, where the thickness of the structural layer was 100–150 μm and the thickness of the sealable, peelable layer was 10–30 μm. The blow-up ratio, BUR was 2.5. The temperature profile was 200°–210°–220°–220°–220°–220°–220° C., the temperature in the die was 220° C.

Films were sealed with KoPP's sealing machine, in which both upper and lower sealing heads were heatable. Both straight and so called cup sealing heads (flat and profiled) were used. Sealing time was 0,5 s, sealing pressure 0,5N/mm$^2$, width of the sealing head 10 mm (straight sealing head) or 5 mm (flat cup sealing head).

Seals were tested with Hounsfield-testing equipment, if sealing was made with a straight sealing head. In that case the specimen was 25 mm broad and the unit of the seal strength was N/25 mm. If the seal was made with a cup sealing head, seals were tested with Instron testing equipment and the unit of the seal strength was N/package. A special device was developed to the Instron equipment to open the lid simulating the real opening. The specimen sealed with the cup sealing head were air-conditioned at least 24 hours in constant conditions (23° C., relative humidity 50%) before testing.

In tests the material was defined peelable if the film sealed to itself or onto thermoformed tray or cup made out of conventional packaging materials could be easily opened by pulling with hands. In that case the opening force was about 2–10N/25 mm or 2–10N/package. The material was sealable, if to itself or onto tray sealed film could not be separated from the other film or tray.

In these experiments polypropylene was used as tray material.

Part of the films were also sealed with the Sentinel 24 ASG-laboratory sealing machine, in which only the upper sealing head was heatable. The sealing time was 0,5 s and sealing pressure 0,5N/mm$^2$. The sealing head was 12 mm broad.

The sealing results are presented in table 2 as well as the results of examples 2–10.

EXAMPLE 2

50% ethylene-hydroxyethymethacrylate (EHEMA) and 50% LD-polyethylene were blended, blown to films and sealed and tested in the method presented in example 1.

EXAMPLE 3

50% ethylene-hydroxyethylmethacrylate (EHEMA) and 50% propylene random-copolymer containing 2–4% ethylene) were blended, blown to films and tested in the same method as in example 1.

EXAMPLE 4

70% ethylene-hydroxyethylmethacrylate (EHEMA) and 30% propylene random-copolymer (containing 2–4% ethylene) were blended, blown to films and tested in the same method as in example 1.

EXAMPLE 5

50% ethylene-hydroxyethylmethacrylate (EHEMA), 25% propylene randomcopolymer (containing 2–4% ethylene) and 25% talc filled polypropylene (containing 60% talc) were blended, blown to films and tested in the same method as in example 1.

EXAMPLE 6

50% ethylene-vinyl acetate-hydroxyethylmethacrylate-terpolymer (EVAHEMA) and 50% propylene randomcopolymer (containing 2–4% ethylene) were compounded, blown to films and tested in the same method as in example 1.

EXAMPLE 7 (comparative example)

20% polybutylene (PB 0110, Shell) and 80% HD-polyethylene were blended, blown to films and tested in the same method as in example 1.

EXAMPLE 8 (comparative example)

20% polybutylene (PB 0110, Shell) and 80% LD-polyethylene were blended, blown to films and tested in the same method as in example 1.

EXAMPLE 9 (comparative example)

50% polybutylene (PB 0110, Shell) and 50% HD-polyethylene were blended, blown to films and tested in the same method as in example 1.

EXAMPLE 10 (comparative example)

50% polybutylene (PB 0110, Shell) and 50% LD-polyethylene were blended, blown to films and tested in the same method as in example 1.

When sealing films to themselves with the Sentinel sealing machine a very broad sealing area (>100° C.) was obtained. With KOPP's machine sealing areas obtained were narrower (10°–20° C.).

When sealing lids cut from different materials to polypropylene cups with the profiled sealing head, much lower sealing temperatures were obtained compared to the flat sealing head. Seal strengths did not vary much when using different sealing heads.

container where the sealing layer was polypropylene. The container was fitted with different food products (mashed potatoes, fat content 2.6% or meat balls and sauce, fat contents 17% and 5%) or water. Containers were kept for one week at the room temperature before the heat treatment, which was made in the Steriflow-autoclave by using two temperature profiles: 15 min in 121° C. for water containing containers and 40 min in 121° C. for containers containing mashed potatoes or meat balls and sauce.

TABLE 2

Sealability and seal strengths

| Example n:o | Sealability (peelable area) °C. | Seal strength to itself (straight sealing head) KOPP N/25 mm | Seal strength to itself (straight sealing head) Sentinel N/25 mm | Seal strength against cup (cup sealing head) KOPP(s10) N | Seal strength against cup (cup sealing head) (s13) N |
| --- | --- | --- | --- | --- | --- |
| 1 | 120 | 1 | | | |
| | 175–185 | | | | 3–5 |
| | 240–250 | | | 4 | |
| 2 | 95–100 | 5–14 | | | |
| | 170–195 | | | | 3 |
| | 240–250 | | | 3 | |
| 3 | 110–120 | 1–2 | | | |
| | 165–185 | | | | 3–7 |
| | 180–195 | | | 2 | |
| | 180–300 | | 2–4* | | |
| 4 | 160–290 | | 2–4* | | |
| 5 | 120–125 | 6–8.5 | | | |
| | 175–185 | | | | 2–5 |
| | 180–270 | | 4–6* | | |
| | 235–250 | | | 2–4 | |
| 6 | 100–130 | 2–10 | | | |
| | 180–270 | | 2–7* | | |
| 7 | 120 | 2 | | | |
| 8 | 105–120 | 2–3 | | | |
| 9 | 120–130 | 2–4 | | | |
| 10 | 105–130 | 2–4 | | | | s10 = even sealing head
s13 = profiled sealing head
* = thickness of the whole film 40 μm, wherefrom peelable layer 10 μm In the examples 11–15 especially heat-processability was investigated.

EXAMPLE 11

50% ethylene-hydroxyethylmethacrylate-copolymer (EHEMA) and 50% propylene randomcopolymer (2–4% ethylene) were dry blended.

The blend was blown to film by using Reifenhäuser 3-layer-blown film equipment so that in one extruder was polypropylene (VB 1950 K, Neste Chemicals) for the structural layer, in the other adhesion polymer (Modic P3000F, Mitsubishi PC) for the middle layer and in the third extruder the above mentioned blend. A 3-layer film was thus obtained where the thickness of structural layer was 20 μm, adhesion layer 10 μm and the thickness of the sealable/peelable layer 10 μm. The blow-up ratio, BUR was oli 2,5. The temperature profile of the extruder was 200°–210°–220°–220°–220°–220°–220° C., and the temperature in die was 220° C.

The sealing temperatures of films were determined with the Sentinel 24 ASG-laboratory sealing machines in which only the upper sealing head was heatable. The sealing time was 0.5 s and the sealing pressure 0.5 N/mm². The width of the sealing head was 12 mm.

The peelable sealing temperature area is given in table 3.

In order to test the heat-processability the films were sealed with Mecapac-sealing machine as a lid to a multilayer Containers containing water were kept for three months both at room temperature (23° C.) and in refrigerator (5° C.). Containers containing mashed potatoes and meat balls at sauce were kept at room temperature for three months.

The seal strengths of lids were tested every month, first time one week after the heat treatment. Testing was made with the Lloyd's material testing equipment to which a special device was developed to open the whole package in a manner simulating reality. The unit of seal strength was then N/package.

Seal strengths in function of time are presented in FIG. 1.

EXAMPLE 12

30% ethylene-hydroxyethylmethacrylate-copolymer (EHEMA) and 70% propylene random-copolymer (2–4% ethylene) were dry blended. The blend was blown to films and tested in the same method as in example 1. The results are in table 3 and FIG. 2.

EXAMPLE 13

50% ethylene-hydroxyethylmethacrylate-copolymer (EHEMA), 25% propylene random copolymer (2–4% ethylene) and 25% talc filled polypropylene were dry blended. The blend was blown to films and tested in the same method as in example 1. The results are in table 3 and FIG. 3.

EXAMPLE 14 (comparative example)

10% styrene modified ethylene-vinyl acetate copolymer (VMX X-150, Mitsubishi PC) and 90% polyethylene were dry blended. VMX is a commercial material, sold for peelable applications.

The blend was blown to films in the same way as in example 1 except that in two extruders was HD-polyethylene (NCPE 1910, Neste Chemicals), when it was obtained a 2-layer film, where the thickness of the structural layer was 30 µm and of the sealable, peelable layer 10 µm. Heat-processability was tested as in example 11. The results are presented in table 3 and FIG. 4.

EXAMPLE 15 (comparative example)

A film was made with the Reifenhäuser 3-layer-film blowing equipment so that in two extruders was HD-polyethylene (NCPE 1910, Neste Chemicals) and in one extruder styrene modified ethylene-vinyl acetate copolymer (VMX X-202, Mitsubishi PC). The thickness of the obtained 2-layer film was 40 µm, structural layer 30 µm and sealable/peelable layer 10 µm. Heat-processability was tested as in example 11. The results are presented in table 3 and FIG. 5.

TABLE 3

| | Sealing temperature areas |
|---|---|
| Example n:o | Sealing temperature area °C. |
| 11 | 170–210 |
| 12 | 170–190 |
| 13 | 170–200 |
| 14 | 160–190 |
| 15 | 170–200 |

The seal strengths of the lids made of films in examples 11–13 remained stable during the whole testing period and the strength was about 10–15N. All seals could be opened by peeling.

The lids made of films in comparative examples 14–15 sealed and did not open any more by peeling.

We claim:

1. A sealable and peelable non-adhesive polymer composition, comprising:
   (A) 20–80 weight-% of a component consisting essentially of a polyolefin, and
   (B) 80–20 weight-% of a component consisting essentially of a co- or terpolymer containing 5–30 weight-% of a hydroxyacrylate that is an ester of a glycol or polyglycol and an acrylic or methacrylic acid, and 0–40 weight-% of a vinyl compound, said polymer composition being a blend of components A and B wherein the individual melt indexes (i) of component (A) are in the range of from 1.8 to 7.0, and (ii) of component (B) are in the range of from 1.5 to 8.0 g/10 min (190° C.).

2. The composition according to claim 1, which comprises: (A) 40–60 weight-% of said polyolefin and (B) 60–40 weight-% of said hydroxyacrylate co- or terpolymer.

3. The composition according to claim 1 or claim 2, wherein said polyolefin is a propylene homopolymer or copolymer containing 1–10 weight-% ∝-olefin.

4. The composition according to claim 2, wherein said polyolefin is a filled propylene polymer containing 5–70 weight-% filler.

5. The composition according to claim 2, wherein said polyolefin is an ethylene homopolymer or random copolymer containing 1–10 weight-% ∝-olefin.

6. The composition according to claim 1, wherein said hydroxyacrylate is hydroxymethylmethylmethacrylate or hydroxypropylmethacrylate.

7. The composition according to claim 1, wherein said vinyl compound is vinyl acetate.

8. The composition according to claim 1, wherein said composition is heat-processable.

9. The composition according to claim 8, wherein said composition is heat processable in a steam sterilization method.

10. A process for preparing a sealable and peelable non-adhesive polymer composition comprising: (A) 20–80 weight-% of a component consisting essentially of a polyolefin and (B) 80–20 weight-% of a component consisting essentially of a co- or terpolymer containing 5–30 weight-% of a hydroxyacrylate that is an ester of a glycol or polyglycol and an acrylic or methacrylic acid, and 0–40 weight-% of a vinyl compound, said polymer composition being a blend of components A and B wherein the individual melt indexes (i) of component (A) are in the range of from 1.8 to 7.0, and (ii) of component (B) are in the range of from 1.5 to about 8.0 g/10 min (190° C.), wherein said process comprises mixing or blending or compounding said components in molten phase or by dry blending.

11. A packaging film or sheet comprised of the polymer composition according to claim 1.

12. A layered structure comprising two or more layers wherein at least one of said layers is a film or sheet manufactured from a polymer composition according to claim 1.

13. A composition according to claim 3, wherein said olefin is a member selected from the group consisting of ethylene, 1-butene, 3-methylhexene, 4-methyl-1-pentene or 1-hexene.

14. A composition according to claim 5, wherein said olefin is a member selected from the group consisting of propylene, 1-butenene, 3-methylpentene, 4-methyl-1-pentene or 1-hexene.

* * * * *